United States Patent [19]

Richards

[11] 3,826,586

[45] July 30, 1974

[54] VARIABLE DIFFUSER CENTRIFUGAL PUMP SHUTTER CONTROL

[75] Inventor: John C. Richards, Mason, Ohio

[73] Assignee: General Electric Company, Cincinnati, Ohio

[22] Filed: Dec. 29, 1972

[21] Appl. No.: 319,219

[52] U.S. Cl.................. 415/42, 415/13, 60/39.28, 60/241
[51] Int. Cl........ F02c 9/04, F01b 25/00, F02c 9/08
[58] Field of Search......... 415/13, 36, 42, 158, 148; 60/243, 39.28

[56] References Cited
UNITED STATES PATENTS

| 1,518,274 | 12/1924 | Rivano | 415/158 |
| 2,725,932 | 12/1955 | Ballantyne et al. | 60/39.28 |
| 3,236,500 | 2/1966 | Kofink | 415/150 |
| 3,591,968 | 7/1971 | Arnett | 60/39.28 |

FOREIGN PATENTS OR APPLICATIONS

| 133,892 | 9/1929 | Switzerland | 415/158 |

Primary Examiner—Carlton R. Croyle
Assistant Examiner—Louis J. Casaregola
Attorney, Agent, or Firm—Thomas J. Bird, Jr.; Derek P. Lawrence

[57] ABSTRACT

A fluid delivery system includes a shuttered diffuser, constant speed, centrifugal pump, a metering valve for distributing fluid delivered by the pump, and a control system for positioning the shutter in response to the operation of the metering valve. The shutter includes a dual area annular piston, one face of which is subjected to the outlet pressure of the pump, while the other face of which is subjected to a signal pressure which is controlled by means of a signal valve associated with the metering valve. The signal valve operates to open the shutter at high flow rates and close the shutter at low flow rates, thereby reducing fluid temprature rise otherwise associated with a constant speed, centrifugal pump.

14 Claims, 3 Drawing Figures

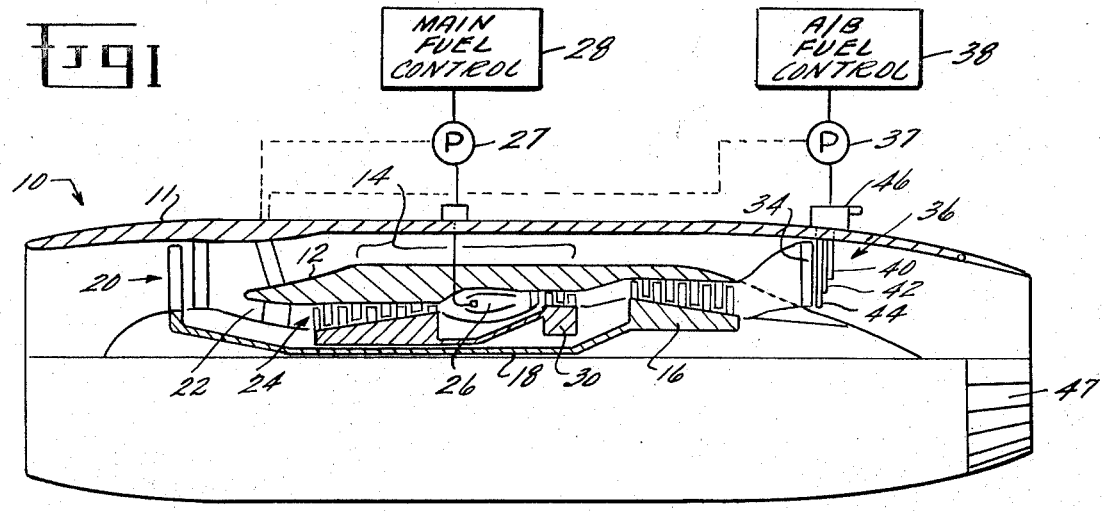
Fig 1
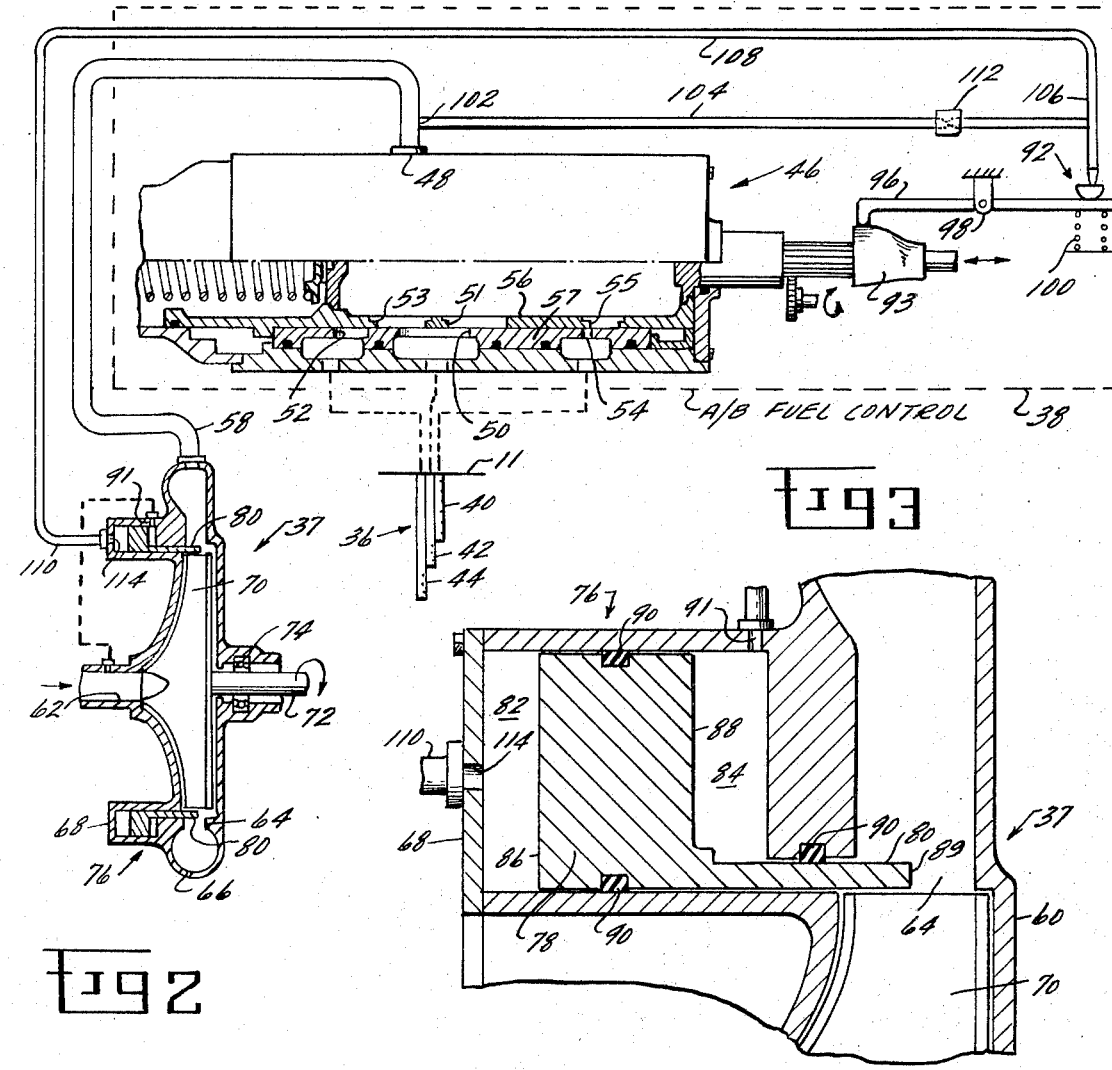
Fig 2
Fig 3

VARIABLE DIFFUSER CENTRIFUGAL PUMP SHUTTER CONTROL

BACKGROUND OF THE INVENTION

This invention relates generally to fluid delivery systems which include centrifugal pumps and, more particularly, to a shuttered diffuser centrifugal pump control system.

The invention herein described was made in the course of or under a contract, or a subcontract thereunder, with the United States Department of the Air Force.

Many fluid pumping applications require a very large flow range with low pump temperature rise throughout the flow range. For example, current and advanced gas turbine engines and variable thrust liquid rocket engines require very large fuel flow ranges with minimum fuel temperature rise from the pumping system. This minimum fuel temperature rise requirement is rather easily attained at high flow rates because of the high flows and the short dwell times within the pumping system. The low pump temperature rise requirement during low flow operation is not as easily attained. In fact, fuel pump performance considerations show that the requirement of a high fuel flow range (high flow turndown) is inconsistent with the requirement of low fuel temperature rise across the pump at low pump outputs.

Centrifugal pumps, while capable of providing the high output requirements of gas turbine engines and variable thrust liquid rocket engine systems, have historically been limited to relatively narrow flow ranges because of the excessive temperature rise and stability problems associated therewith at low percentages of rated flow. Up until the very recent past, all previous attempts at providing a centrifugal pump with relatively wide flow ranges have met with limited success. More recently, however, a centrifugal pump having a variable diffuser which utilizes a slotted valve to selectively close off diffuser vane entry passages as the fuel rate of the pump is decreased has been shown to provide the desired flow range and temperature rise characteristics. Such a pump is described and claimed in application Ser. No. 213,417, filed Dec. 29, 1971, for D. Y. Davis, and assigned to the same assignee as the present invention.

While the shuttered diffuser centrifugal pump has proven successful, a simple means for controlling the position of the shutter valve is still required.

SUMMARY OF THE INVENTION

It is an object of this invention, therefore, to provide a simple control system for controlling the position of a shutter valve associated with the diffuser portion of a centrifugal pump. It is a further object of this invention to provide such a control system which utilizes the pressure of fluid flowing through the pump to provide the desired servo force for controlling the shuttered control valve.

Briefly stated, the above and similarly related objects are attained by providing a centrifugal pump in which impeller discharge area is varied by a sliding shutter that also acts as a dual-area, annular piston. One of the smaller piston areas is exposed to impeller discharge pressure and one is exposed to pump inlet pressure, while the larger piston area is exposed to a shutter signal pressure. The shutter signal pressure ranges between the pump inlet pressure and the pump discharge pressure, and the differential area of the piston and varying pressures thereon act to move the shutter to different points of travel in order to control the output area of the pump. The shutter signal pressure is controlled by means of a signal valve associated with a metering valve which forms a portion of the overall fuel control system.

DESCRIPTION OF THE DRAWINGS

While the specification concludes with a series of claims which particularly point out and distinctly claim the subject matter which Applicant regards as his invention, a complete understanding of this invention may be gained from the following detailed description of a preferred embodiment thereof. This description is given in connection with the accompanying drawings in which:

FIG. 1 is a schematic view, taken partially in section, of a gas turbine engine incorporating the present invention;

FIG. 2 is a schematic, cross-sectional view of the inventive control system; and FIG. 3 is an enlarged, cross-sectional view of a portion of FIG. 2.

DESCRIPTION OF A PREFERRED EMBODIMENT

Referring now to the drawings wherein like numerals correspond to like elements throughout, attention is directed initially to FIG. 1 wherein an augmented turbofan engine 10 which is capable of use in the propulsion of aircraft is shown. This engine comprises an outer casing or duct wall 11 and an inner duct wall 12. A core engine 14 disposed within the duct wall 12 generates a hot gas stream for driving a fan turbine 16. This turbine is connected by a shaft 18 to a bladed rotor or fan 20 which pressurizes an airstream. The outer annular portion of this airstream passes between the duct walls 11 and 12, while the inner portion of the airstream, pressurized by the fan 20, flows through inlet 22 and is further pressurized by a compressor 24 of the core engine 14 to support combustion of fuel in a core engine combustor 26.

Fuel is delivered to the core engine combustor 26 by means of a pump 27, the output of which is controlled by means of a main fuel control 28, which is mounted to the outer duct wall 11. The hot gas stream then drives a core engine turbine 30 connected through a shaft 32 to the core engine compressor 24. After driving the turbine 30, the hot gas stream then drives the fan turbine 16, as previously mentioned. The flow through the outer annular portion of the airstream and the flow exiting the fan turbine 16 are thereafter mixed in a mixer 34 located downstream of the fan turbine 16.

In the particular engine shown in FIG. 1, the mixed airstreams are then provided with additional fuel by means of augmenter spraybars 36 with the amount of fuel thus delivered being controlled by a fuel pump 37 and an augmenter fuel control 38 mounted to the outer duct wall 11. As described in more detail in application Ser. No. 286,434, filed Sept. 5, 1972, entitled Augmenter Fuel Injection Mounting System, invented by D. O. Nash, which application is assigned to the same assignee as the present application, the augmenter spraybars 36 include fan spraybars 40, core engine spraybars 42, and local or lightoff spraybars 44. The augmenter fuel control 38 acts to control the amount of fuel delivered to the fan spraybars 40, the core engine spraybars 42, and local spraybars 44 through a fuel metering valve 46.

The fuel thus delivered to the airstream is ignited by means of a suitable igniter (not shown). The resultant high energy gas stream provides further thrust to the gas turbine engine 10 as it exits through an exhaust nozzle 47 located downstream of the mixer 34.

The mixed flow, augmented turbofan engine 10, described above, is merely illustrative of one type of engine to which the present invention may be applicable. As will become obvious to those skilled in the art, the present inventive control system may be applied to any type of gas turbine engine and, more generally, may be applied to other types of apparatus which utilize centrifugal fuel pumps. For example, the present inventive control system may be applicable to liquid fuel rocket engines. The description of the gas turbine engine 10 is, therefore, merely meant to be illustrative of one particular application of the present invention.

Referring now to FIG. 2, portions of the augmenter fuel system described above in connection with FIG. 1 are shown in schematic form. As shown therein, the augmenter spraybars 36 are provided with the metering valve 46 which distributes fuel to the fan spraybars 40, the core engine spraybars 42, and the local or lightoff spraybars 44. The metering valve 46 consists of a simple sleeve valve in which fuel is delivered to an inlet 48 and thereafter distributed through separate metering outlets 50, 52 and 54 to the fan spraybars 40, the core engine spraybars 42 and the local spraybars 44, respectively. Fuel is delivered to the respective spraybars in any manner known to those skilled in the art with one preferred manner being described in the above-referenced Nash application.

The area of the outlets 50, 52 and 54 is controlled in the present instance by means of a translating spool 56 located within a sleeve 57, which form parts of the metering valve 46. The spool 56 includes openings 51, 53 and 55, which register with the outlets 50, 52 and 54 in a well-known manner. The inlet 48 may also be formed in the spool 56 as shown in FIG. 2 and, in certain applications, may be made of various shapes to control the total amount of fuel to be distributed.

Fuel is delivered to the inlet 48 of the metering valve 46 through a conduit 58 by means of the fuel pump 37, which in the present case comprises a constant speed centrifugal pump. (While only a single metering valve 46 and conduit 58 are shown in FIG. 2, the fuel delivery system could include a plurality of each, with individual metering valves being provided for each fuel injection point of the engine.) The fuel pump 37 includes an outer casing 60 which forms an inlet 62, an annular outlet 64, and a diffuser 66 which surrounds the outlet 64. In addition, the casing 60 forms, or has associated therewith, an annular piston chamber 68 located adjacent the diffuser 66.

The casing 60 surrounds an impeller 70, which is mounted for rotation within the casing 60 on a shaft 72 supported by one or more bearings 74. The shaft 72 may be driven by any source of external power, such as by a gearbox mounted on the outer casing of the engine 10.

As described above, the constant speed centrifugal fuel pump 37 can be designed to operate with high efficiency only over some small flow range, normally the high flow range. When operated at relatively low flows, the pump 37 may cause excessive temperature rise in the fuel and/or be unstable. For this reason, the fuel pump 37 is provided with a slideable shutter 76, which comprises a hollow cylinder having an annular piston 78 formed integrally therewith and located within the piston chamber 68. As shown most clearly in FIG. 3, the shutter 76 is positioned such that a cylindrical portion 80 located opposite, and preferably formed integrally with, the piston 78 is capable of extending into the annular outlet 64 and selectively blocking portions thereof.

It will become apparent from the following description that Applicant's inventive control system is capable of usage with any type of slideable shutter. A preferred version of the shutter 76, however, is described and claimed in application Ser. No. 213,417, filed Dec. 29, 1971, entitled Variable Diffuser Centrifugal Pump, invented by D. Y. Davis, and assigned to the same assignee as the present invention. Suffice it to say that fuel is delivered to the inlet 62 of the pump 37 from a suitable storage area (not shown) and is acted upon by the impeller 70 and flows through the outlet 64 to the diffuser 66. From the diffuser 66 the fuel flows through the conduit 58 to the inlet 48 of the metering valve 46. The total amount of fuel delivered to the diffuser 66, is controlled by the position of the shutter 76, and it is the method and apparatus for controlling the position of this shutter which forms a significant portion of Applicant's invention.

Referring to FIGS. 2 and 3, the annular piston end 78 of the shutter 76, when positioned with the piston chamber 68, acts to divide the chamber 68 into two separate pressure chambers, a head chamber 82 and a rod chamber 84. When thus positioned, the piston 78 provides a first pressure face 86 and a second pressure face 88 located within the chambers 82 and 84, respectively, and a third pressure face 89 located within the outlet 64 of the pump. As further shown in FIG. 3, the casing 60 and the piston 78 are designed such that the area of the first pressure face 86 is approximately equal to the sum of the areas of the second pressure face 88 and the third pressure face 89. It will be obvious from viewing FIGS. 2 and 3 that the pressure in the chambers 82 and 84, and in the outlet 64, and thus the forces exerted on the pressure faces 86, 88 and 89 will determine the axial position of the slideable shutter 76.

As best shown in FIG. 3, the chamber 84 is pressurized to a level equal to the inlet pressure of the pump 37 by means of a small passage 91, while the pressure face 89 is subjected to the outlet pressure of the pump in the outlet 64. Suitable sealing means 90 are provided with the piston 78 to preclude the flow of fluid between the pressure chambers 82 and 84.

The chamber 82 is exposed to a shutter signal pressure which ranges between the pump inlet pressure and the pump discharge pressure under action of the control sytem shown in FIG. 2. This control system includes a signal valve 92, which is associated with the metering valve 46. The signal valve 92 may take many forms and for this reason is shown schematically. In the present instance, the signal valve 92 is controlled by means of the position of the metering valve 46 through a simple camming relationship. That is, a cam 93 having a cam surface 94 is designed into the spool 56 and a cam follower 96 is constrained to rotate about a pivot point 98 to open and close the signal valve 92.

As further shown in FIG. 2, the signal valve 92 is normally biased closed by means of a spring 100, while the chamber 82 is connected to the conduit 58 by means of a bleed tap 102, and piping sections 104, 106, 108, 110. The piping section 104 includes a restriction 112 located a short distance upstream of a point where the piping section 104 intersects the piping section 106. The piping section 106 is connected at one end to the piping section 108, while it terminates at its opposite end at the signal valve 92. The piping sections 106, 108, and 110 are interconnected in any desired manner, and the piping section 110 is connected to the pressure chamber 82 through a suitable opening 114.

The operation of the inventive fuel control system will now be described in connection with FIGS. 2 and 3. Fuel enters the inlet 62 of the centrifugal pump 37 and is discharged through the outlet 64 after being acted upon by the impeller 70. Since the pump 37 is a constant speed driven pump, a constant flow rate would normally be discharged through the outlet 64 into the diffuser 66. Since the fuel requirements of the system vary considerably, i.e., the metering valve 46 varies the amount of fuel delivered to the spraybars and does not require all of the output of the pump 37 during many portions of the operating cycle, the slideable shutter 76 is utilized to selectively close or open the annular outlet 64 in order to prevent recirculation of the fluid which is not utilized by the metering valve 46 from the diffuser 66 back to the impeller 70.

A certain portion of the fuel flowing through the inlet 62 is bled through the passageway 91 to pressurize the chamber 84. In this manner, the chamber 84 is pressurized to a level equal to that of the inlet pressure of the pump 37. At the same time, the pressure face 89 is exposed to impeller 70 discharge pressure in the outlet 64.

The fluid in the diffuser 66 is then directed to the conduit 58, and a portion of the fluid flowing through the conduit 58 is bled through the port 102. This bleed flow travels through the piping section 104 and the restriction 112 to the piping section 106. Since the signal valve 92 is biased closed by means of the spring 100, the flow to the section 106 is then delivered to the chamber 82 via the piping sections 108 and 110. Thus, when the signal valve 92 is closed, the chamber 82 is pressurized to a level approaching that of the discharge pressure of the pump 37, with the actual level being dependent upon the pressure drop across the restriction 112 and the internal losses in the piping sections 104, 106, 108 and 110.

Referring to FIG. 3, since the area of the pressure face 86 is substantially equal to the sum of the areas of the pressure faces 88 and 89, and since the pressure exerted on the pressure face 88 is less than that initially exerted on the pressure face 86, while the pressure exerted on the pressure face 89 is approximately equal to that on the pressure face 86, there will initially be exerted on the piston 78 a net force to the right, as shown in this figure. As a result of this force, the shutter 76 will move in the direction to close the outlet 64 thus reducing the amount of fuel delivered to the diffuser 66 by the pump 37 and thereby reducing recirculation and the resultant power loss associated with the pump at low flow levels.

As the spool 56 of the metering valve 46 reaches a particular point of travel, the cam surface 94 acts upon the cam follower 96 to open the signal valve 92. Since the flow area of the signal valve 92 is greater than that of the restriction 112, the flow in the piping 106 will be dumped through the signal valve 92 thereby reducing the pressure within the pressure chamber 82. At an appropriate design point, the pressure in the chamber 82 will reach a point whereupon the forces on the faces 88 and 89 will be sufficient to move the shutter 76 to the left, as shown in FIGS. 2 and 3, thereby opening the annular outlet 64. This will result in an increase in the outlet 64 area and the portion of diffuser area open to flow, thereby providing a more efficient pump in the high flow range.

By appropriately designing the cam surface 94, the spring 100, and the piston 78, the position of the shutter 76 can be accurately controlled to match the operating range of the fuel system. In this manner, the total amount of the fuel delivered by the constant speed, centrifugal pump 37 can be accurately controlled and the problems of heat rise and instability normally associated with a constant speed pump can be overcome.

It should be readily apparent to those skilled in the art that certain modifications could be made in the above described system without departing from the broader aspects of Applicant's invention. For example, the above described system is indicative of one in present use with an augmenter fuel system and the metering valve 46 is utilized in such a system to accurately distribute fuel to different augmenter spraybars. The inventive system could readily be adapted to a main fuel system in which a single output metering valve could be provided for individual fuel injection points of the engine. In the alternative, a metering valve could be utilized to distribute fuel to a multitude of individual fuel injection points in a main fuel system. It should also be apparent that the details of the metering valve 46 are not critical to the present invention, and that the sliding spool type metering valve could be replaced with any suitable alternative design. It is intended, therefore, that the appended claims cover these and similar modifications to Applicant's inventive system.

What is claimed is:

1. A fluid delivery system comprising:
   a centrifugal pump having an inlet, an outlet, a diffuser surrounding said outlet, and an impeller for delivering fluid from said inlet to said diffuser,
   valving means for distributing fluid delivered by said pump,
   piping means for delivering fluid from said diffuser to said valving means,
   a sliding shutter having an annular piston associated therewith, said shutter being positioned within said outlet of said pump and adapted to vary the diffuser area of said pump, and
   means for controlling the position of said shutter, said control means including a signal valve which is controlled by the operative position of said valving means, said signal valve acting to control the pressure on a first face of said piston as a function of the operative position of said valving means.

2. The fuel delivery system of claim 1 further including means for pressurizing a second face of said piston to the outlet pressure of said pump.

3. The fuel delivery system of claim 1 further characterized in that said piston is a dual-area annular piston, a first face of which is subjected to a signal pressure the level of which is controlled by said signal valve.

4. The fuel delivery system of claim 3 further characterized in that the signal pressure varies between the outlet pressure of said pump and the inlet pressure thereof, said piston includes second and third pressure faces, the sum of the areas of which is substantially equal to the area of said first face, and said second face is subjected to the inlet pressure of said pump while said third face is subjected to the outlet pressure thereof.

5. The fuel delivery system of claim 1 further characterized in that said pump is a constant speed driven pump.

6. The fuel delivery system of claim 1 wherein said valving means include a metering valve for separating fluid supplied thereto into at least two portions.

7. The fuel delivery system of claim 6 wherein said metering valve has associated therewith camming means which control said signal valve.

8. The fuel delivery system of claim 7 wherein said camming means are associated with a sliding spool portion of said metering valve.

9. A fuel control system for a gas turbine engine comprising:
a centrifugal pump having an inlet, an outlet, a diffuser surrounding said outlet, and an impeller for delivering fuel from said inlet to said diffuser,
a sliding shutter having an annular piston formed therewith, said shutter being positioned within said outlet of said pump and adapted to vary the diffuser area of said pump,
a fuel control having associated therewith a metering valve for distributing the total amount of fuel to separate fuel injecting means associated with said engine,
piping means for delivering fuel from said diffuser to said metering valve, and
means for controlling the position of said shutter, said control means including a signal valve which is controlled by the position of said metering valve, said signal valve acting to control the pressure imposed on said annular piston as a function of the position of said metering valve.

10. The fuel control system of claim 9 wherein said centrifugal pump is a constant speed driven pump.

11. The fuel control system of claim 9 wherein said piston comprises a dual-area, annular piston having a first face subjected to a signal pressure, the level of which is controlled by said signal valve, a second face subjected to the outlet pressure of said pump, and a third face subjected to the inlet pressure of said pump.

12. The fuel control system of claim 11 wherein said metering valve includes a sliding spool and said spool has associated therewith camming means which control said signal valve.

13. The fuel control system of claim 12 further characterized in that said piping means include a bleed port positioned between said diffuser and an inlet of said metering valve, said bleed port being fluidically connected to said first face of said piston by means of tubing.

14. The fuel control system of claim 13 wherein said signal valve lies in fluid flow communication with said tubing and said tubing includes a restriction which is located between said bleed port and said signal valve, the area of said restriction being smaller than the area of said signal valve when said signal valve is open, whereby said first face is subjected to the discharge pressure of said pump when said signal valve is closed and to a substantially lower pressure when said signal valve is open.

* * * * *